United States Patent [19]

Ketterer

[11] Patent Number: 4,504,612
[45] Date of Patent: Mar. 12, 1985

[54] POLYESTER ANTIFUME ADDITIVE FOR SPANDEX FIBER

[75] Inventor: Charles C. Ketterer, Waynesboro, Va.

[73] Assignee: E. I. Du Pont de Nemours and Company, Wilmington, Del.

[21] Appl. No.: 535,687

[22] Filed: Sep. 26, 1983

[51] Int. Cl.$^3$ .................... D02G 3/00; B32B 27/40
[52] U.S. Cl. .................... 524/101; 428/423.7; 428/423.1; 428/364; 528/906; 524/153; 524/151; 524/147; 524/310
[58] Field of Search .............. 428/364, 423.1, 423.7; 528/906; 525/440; 524/153, 151, 310, 101, 147

[56] References Cited

U.S. PATENT DOCUMENTS 4,233,412 12/1980 Body et al. .................... 525/440

*Primary Examiner*—George F. Lesmes
*Assistant Examiner*—Beverly K. Johnson

[57] ABSTRACT

Saturated aliphatic polyesters having a repeating unit which has the structural form of a residue of a glycol combined with a residue of a diacid or the form of a residue of a hydroxy acid, the number of carbon atoms in the shortest chain between ends of the residues being in the range of 3 to 10 for the glycol residue and no more than 12 for the diacid residue or for the hydroxy acid residue, provide polyether-based spandex fibers with improved resistance to discoloration induced by exposure to nitrogen dioxide fumes.

10 Claims, No Drawings

POLYESTER ANTIFUME ADDITIVE FOR SPANDEX FIBER

BACKGROUND OF THE INVENTION

1. Field of the Invention

This invention relates to a spandex fiber which has increased resistance to discoloration caused by exposure to fumes. In particular, the invention concerns a polyether-based spandex fiber to which improved resistance to nitrogen dioxide is imparted by a saturated aliphatic polyester additive.

2. Description of the Prior Art

Spandex fibers are well known in the art. The fibers are formed from long chain synthetic polymer comprising at least 85% segmented polyurethane. Spandex fibers made from polyether-based polyurethane polymers are known to discolor upon prolonged exposure to fumes, especially nitrogen dioxide, which is an important constituent of combustion gases and atmospheric smog. Many agents have been suggested for increasing the resistance of polyether-based spandex fibers to such fume-induced discoloration. Among these many agents are those of Japanese Patent Application Publication No. (Sho) 49-35812 which discloses a polyether-based polyurethane that is stabilized against fume-induced discoloration by having dispersed within the fiber a monoester compound which is the reaction product of a saturated higher fatty acid and a saturated higher fatty alcohol, the acid and the alcohol each having between 12 and 18 carbon atoms. Monoesters such as tridecyl laurate, stearyl laurate, dodecyl stearate and hexadecyl palmitate are specifically exemplified. However, such monoesters of the art, as is shown in Example IV below, are much inferior to the polyester additives used in accordance with the present invention for increasing the resistance of polyether-based spandex fibers to fume-induced discoloration. Furthermore, the monoester additives of the art often can be removed from the fibers by ordinary scouring procedures commonly used in fabric manufacture.

From a practical standpoint, some discoloration of the fiber can be tolerated without it being noticed by users of fabrics made with polyether-based spandex fibers. Nonetheless, the utility of the fibers would be enhanced by improvements in the resistance of the fibers to fume-induced discoloration. It is an object of this invention to provide such an improvement.

SUMMARY OF THE INVENTION

The present invention provides an improved polyether-based spandex fiber which is of the type that contains a saturated aliphatic ester compound. The improvement comprises incorporating within the fiber a saturated aliphatic polyester in an amount which is effective in reducing fume-induced discoloration of the fiber, the saturated aliphatic polyester having a repeating unit which has the structural form of a residue of a glycol combined with a residue of a diacid or the form of a residue of a hydroxy acid wherein the number of carbon atoms in the shortest chain between ends of the residues is for glycol residues in the range of 3 to 10, preferably 3 to 8, and for diacid residues or hydroxy acid residues usually no more than 12, but preferably in the range from 4 to 9. The polyester additive has a number average molecular weight which is usually greater than 600 and less than 10,000, but preferably is in the range of 1250 to 4500. Generally, the polyester additive amounts to between 0.5 and 10% by weight of the fiber, but preferably is in the range of 1 to 5%. Linear polyester additives are preferred. Poly(caprolactone) and poly(hexamethylene adipate) are particularly preferred. The saturated aliphatic polyesters are especially effective antifume agents when employed in combination with other stabilizers, such as with a hindered phenol or with a hindered phenol and a phosphite.

DETAILED DESCRIPTION OF PREFERRED EMBODIMENTS

As used herein, the term fiber includes staple fibers and/or continuous filaments. The term saturated aliphatic polyester means a polyester wherein the repeating unit is a saturated linear-chain hydrocarbon, a saturated branched-chain hydrocarbon or a saturated cyclic hydrocarbon.

In accordance with the present invention, the effective amount of the polyester additive can vary over a fairly broad range. Improvements in the resistance of the polyether-based spandex fibers to fume-induced discoloration are obtained in some cases with saturated aliphatic polyester concentrations of about 0.5 percent or less, by total weight of the fiber (without finish). However, larger improvements are usually obtained with concentrations at at least 1%. Although large concentrations of the additive (e.g., 10% or more) can sometimes be used, concentrations of less than 5% are usually employed to avoid possible adverse effects on some of the physical properties of the spandex fiber. Some of the saturated aliphatic polyester additives have a maximum effectiveness at a concentration in the middle or the lower part of the 0.5-to-10% range, rather than at the highest concentrations. However, over this concentration range, most of the polyester additives are more effective as the concentration is increased.

The saturated aliphatic polyester additives which are suited for use in the present invention have a number average molecular weight that usually is at least 600 and less than 10,000. The preferred molecular weight range for the most effective additives is usually between 1250 and 4500.

The repeating unit of the saturated aliphatic polyester additives generally has the structural form of a residue of a glycol combined with a residue of a diacid or the form of a residue of a hydroxy acid. The number of carbon atoms in the shortest chain between the ends of the glycol residue is in the range of 3 to 10, but preferably is in the range of 3 to 8. The number of carbon atoms in the shortest chain between ends of the diacid residue or between ends of the hydroxy acid residue is usually no more than 12, but preferably is in the range from 4 to 9.

Among examples of repeating units of the linear saturated aliphatic polyester additives that are useful in accordance with the present invention are those listed below, along with their abbreviations. The abbreviations for polyester repeating units based on $\alpha,\omega$-glycols combined with $\alpha,\omega$-dicarboxylic acids intermediates are designated by a combination of numbers representing the numbers of carbon atoms in the intermediates. The number followed by a "G" represents the number of carbon atoms in the glycol. The number after the hyphen represents the number of carbon atoms in the acid. Note that a carbonate (e.g., poly(hexamethylene carbonate), 6G-1) is considered herein to contain the residue of a "diacid" having but one carbon atom in the shortest chain between ends of the "diacid" residue.

| Abbreviation | Chemical Name |
|---|---|
| 3G-4 | poly(trimethylene succinate) |
| 3G-9 | poly(trimethylene azelate) |
| 4G-6 | poly(tetramethylene adipate) |
| 4G-9 | poly(tetramethylene azelate) |
| 4G-12 | poly(tetramethylene dodecanedioate) |
| 5G-6 | poly(pentamethylene adipate) |
| 5G-9 | poly(pentamethylene azelate) |
| 6G-1 | poly(hexamethylene carbonate) |
| 6G-4 | poly(hexamethylene succinate) |
| 6G-6 | poly(hexamethylene adipate) |
| 6G-9 | poly(hexamethylene azelate) |
| 8G-4 | poly(octamethylene succinate) |
| 8G-6 | poly(octamethylene adipate) |
| 8G-9 | poly(octamethylene azelate) |
| 10G-4 | poly(decamethylene succinate) |
| PCAP | poly(caprolactone) |

Examples of branched saturated aliphatic polyester repeating units in accordance with the invention include poly(2,2-dimethyl-1,3-propylene succinate) and poly(2,2-dimethyl-1,3-propylene adipate), respectively designated herein as DM3G-4 and DM3G-6. Examples of cyclic polyester repeating units in accordance with the invention are poly(cyclohexyl-1,4-dimethylene adipate) and poly(cyclohexyl-1,4-dimethylene dodecanedioate), respectively designated herein as HPXG-6 and HPXG-12. The cyclohexyl-1,4-dimethylene part of the repeating unit can be derived from hydrogenated p-xylene glycol (HPXG).

Usually, the saturated aliphatic polyester additives suited for use in the fibers of the present invention are homopolymers. However, it is expected that copolymer additives or mixtures of homopolymer additives, which meet the general description given above for the saturated aliphatic polyester additives also would be effective in improving the resistance of polyether-based spandex fibers to fume-induced discoloration.

For ease of manufacture, the saturated aliphatic polyester additives which are useful in the present invention preferably are terminated with hydroxyl groups, as for example poly(caprolactone)diol and poly(hexamethylene adipate)diol. However, other chemical groups may be used to terminate the polyester additive. Among such groups are alkyl ethers, urethanes, acyls, or any other terminal group that does not add unwanted color and does not detrimentally affect the antifume characteristics or other physical properties of the spandex fiber.

Conventional methods, such as those described in R. Hill, "Fibres From Synthetic Polymers," Elsevier Publishing Co., New York, p. 144 ff (1953), are satisfactory for synthesizing the polyester additives for use in the present invention. These methods include: (a) direct esterification of an acid and a glycol or self-condensation of a hydroxy acid; (b) ester interchange between a glycol and an ester of an acid; (c) reaction of a glycol with an acid chloride; and (d) reaction of a diacetate of a glycol with the acid or its ester. The additive can also be synthesized by known base-catalyzed, ring-opening polymerization of suitable lactones. As described herein, the residue of a ring-opened lactone is considered to be a hydroxy acid residue. Linear saturated aliphatic polyester additives are preferred for use in accordance with the present invention.

Two particularly effective linear polyesters which are also preferred because of their relative ease of manufacture, are poly(caprolactone)diol and poly(hexamethylene adipate) glycol.

The polyether-based spandex fibers containing saturated aliphatic polyester additives in accordance with the present invention may also contain a variety of other conventional additives for different purposes, such as pigments, brighteners, whiteners, lubricants, other stabilizers, etc, as long as such additives do not produce antagonistic effects with the polyester additive. Also, when finishing or dyeing fabrics or yarns containing fibers of the invention, care must be exercised to avoid deactivating or extracting the additive.

The saturated aliphatic polyester additives have been found to be particularly effective in combination with conventional thermal and oxidative stabilizers that have been suggested for use in spandex fibers. Combinations which include phenolic stabilizers are preferred. Examples of such phenolic antioxidants include: Cyanox ® 1790, which is 2,4,6-tris(2,6-dimethyl-4-t-butyl-3-hydroxybenzyl)-isocyanurate manufactured by American Cyanamid Co. of Bound Brook, N.J. Wingstay ® L, which is a condensation product of p-cresol, dicyclopentadiene and isobutene manufactured by Goodyear Chemicals Co. of Akron, Ohio; Santowhite ® powder, which is 1,1-bis(2-methyl-4-hydroxy-5-t-butylphenyl) butane manufactured by Monsanto Company, St. Louis, Mo.; various Irganox ® phenol antioxidants manufactured by Ciba-Geigy Corp. of Ardsley, N.Y.; various Ethanox ® phenolic antioxidants manufactured by Ethyl Corp. of Baton Rouge, La.; and the like.

The resistance of polyether-based spandex fibers to fume-induced discoloration is further enhanced by including in the fiber, along with the saturated aliphatic polyester and phenolic additives, a phosphite additive. Particularly preferred phosphites for this purpose include dialkyl phenyl phosphites of the type described in W. Lewis, U.S. patent application Ser. No. 535,688, which was filed on Sept. 26, 1983. These dialkyl phenyl phosphites have at least half of their alkyl groups branched at the alpha position and their phenyl groups are unsubstituted or monoalkyl substituted. Among such dialkyl phenyl phosphites are decaphenyl heptakis(dipropylene glycol) octaphosphite (abbreviated hereinafter as "DHOP," available from Borg-Warner Chemicals Co. of Parkersburg, W. Va.), diphenyl diisodecyl (hydrogenated bisphenol A) diphosphite, diphenyl di-2-octyl (1,12-dodecanediol) diphosphite, tetra-2-octyl (bisphenol A) disphosphite, phenyl 2-octyl 1-octadecyl phosphite, phenyl di-2-decyl phosphite and the like.

Preferred additive combinations for polyether-based spandex fibers in accordance with the present invention include, in addition to a linear saturated aliphatic polyester additive such as PCAP or 6-G-6, a phenolic antioxidant such as Cyanox ® 1790 or Wingstay-L ® and a phosphite such as Weston ® DHOP.

Before a particular additive is adopted for large-scale use in spandex fibers, the effectiveness of the additive in increasing the discoloration resistance of the fiber should be tested with the particular other additives with which it will be used to ensure against antagonistic effects among the additives. Simple small-scale tests for this purpose include the $NO_2$-exposure and SCAT-exposure tests, described below and in the Examples, as well as other known procedures.

A convenient way of making spandex fibers according to the present invention involves preparing a solution of a polyether-based spandex polymer in an organic solvent and then dry-spinning the polymer solution through orifices into filaments. An effective amount of the saturated aliphatic polyester, usually along with suitable amounts of a phenolic antioxidant and other desired additives, is dispersed in the filaments by dissolving or dispersing the additives in the solvent and then adding the resultant liquid to the polymer solution at any of several points in the solution-handling system upstream of the orifices.

The following test procedures are used for measuring various parameters discussed above.

Discoloration of test samples in the form of wound yarn or fabric layers is measured by a change in "b" value, as determined by means of a differential colorimeter (e.g., a model D-25-3 Differential Colorimeter manufactured by Hunter Associates Laboratory, Inc., Reston, Va.) which has been calibrated against the manufacturer's standard reference plates. When the sample is a yarn, yarn is wound under low tension on an aluminum plate measuring 3 inches by 4 inches by 1/16 inch (7.6×10.7×0.16 cm), to form a layer approximately ⅛-inch (0.32-cm) thick. When the sample is a fabric, four layers of the fabric are placed on a glass plate.

The primary means used herein for determining the resistance of spandex fibers to fume-induced discoloration is an $NO_2$-exposure test. In this test, yarn samples, prepared as described in the preceding paragraph, are exposed for 20 hours (unless stated otherwise) to a nitrogen-dioxide-rich atmosphere in a 200-liter chamber of a Scott Controlled Atmosphere Tester. Nitrogen dioxide is fed to the chamber at a rate of about 40 $cm^3$/min and is circulated in the chamber by a fan.

The $NO_2$-test results can be confirmed by means of conventional Scott Controlled Atmospheric Tester (SCAT) tests. In SCAT tests, the combined effects of light and other gases, in addition to $NO_2$, are determined. In the SCAT test, spandex fiber samples, as described above, are exposed for 20 hours (unless stated otherwise) in the 200-liter test chamber, to a synthetic gaseous mixture made up of about seven parts per million (ppm) nitrogen dioxide, seven ppm sulfur dioxide, and forty-six ppm 2-pentene in air at a total flow of 5.8 liters per minute and to light from eight "daylight" and four "black" fluorescent tubes (e.g., type F30T8 and FTO38BL manufactured by General Electric Co.). A fan mixes and circulates the gases in the test chamber. This exposure has been found to correlate with end-use performance in smoggy atmospheres, such as those encountered in the city of Los Angeles, Calif. The SCAT unit is described in greater detail in Technical Information Bulletin L-33 (issued by the Textile Fibers Department Technical Services Section of E. I. du Pont de Nemours and Company, Wilmington, Del.).

For each $NO_2$- and SCAT-exposure test, the "b" values of the samples are measured before and after exposure. Differences between before-exposure and after-exposure "b" values are reported as "Δb" values in the examples below. Because of variability in the exposure conditions of the $NO_2$ and SCAT tests, a control sample is always exposed simultaneously with the test samples to provide a convenient way to compare the results from one test batch to another. Unless otherwise stated all fibers were tested in the as-spun condition. Control spandex yarn samples, as described in Example I, were used in obtaining all of the $NO_2$- and SCAT-test results recorded herein.

The number average molecular weight of the polyester additives is determined by conventional methods, such as are described by D. J. David and H. B. Staley. "Analytical Chemistry of Polyurethanes," Vol. XVI, Part III, p. 321, Wiley-Interscience, N.Y., (1969). In Example III below, wherein the antifume effectiveness of many polyester diol additives is compared, the molecular weight of the diols is determined from their hydroxyl number, which is measured by the imidazole-pyridine catalyst method described by S. L. Wellon et al, "Determination of Hydroxyl Content of Polyurethane Polyols and Other Alcohols," *Analytical Chemistry*, Vol. 52, No. 8, pp. 1374–1376 (July 1980).

The invention is illustrated further, but is not intended to be limited by the following examples in which all percentages, unless otherwise specified, are by total weight of the fibers (without finish). Each Example demonstrates the surprisingly large improvement in discoloration resistance that is imparted to spandex fibers by incorporating into a polyether-based spandex fiber an effective amount of a saturated aliphatic polyester in accordance with the invention. Example I illustrates a preferred embodiment of the present invention. Example II presents another preferred saturated aliphatic polyester additive in accordance with the invention. In Example III, the antifume effectiveness of nearly two dozen polyester additives in accordance with the invention are compared with some other polyester additives. In Example IV, the antifume effectiveness of polyester additives of the present invention is compared with the antifume effectiveness of a monoester additive of the art.

In summarizing the data of the various tests performed in the Examples below, the following symbols and abbreviations are used:

Δb is the "b" value at the start of the test subtracted from the "b" value at the end of the test diff.=Δb of control subtracted from Δb of sample: negative values indicate the sample discolored less than the control subscript s designates a sample according to the invention subscript c designates a control sample test numbers designated by Arabic numbers are for samples of the invention and those designated by letters are for comparison samples conc. % is the weight percent of the additive based on the total weight of the fiber (finish free).

Note that the "b" value of each sample and control at the start of each test was in the range of about −2.5 to −1.5.

EXAMPLE I

This example illustrates a preferred embodiment of the invention. The discoloration resistance of a spandex yarn made from a polyether-based linear segmented polyurethane is greatly increased by the presence in the yarn of a saturated aliphatic polyester additive in accordance with the invention.

A solution of segmented polyurethane in N,N-dimethylacetamide ("DMAc") was prepared in accordance with the general procedure described in U.S. Pat. No. 3,428,711 (e.g., first sentence of Example II and the description of Example I). An intimate mixture was prepared of p,p'-methylenediphenyl diisocyanate and polytetramethylene ether glycol (of about 1800 molecular weight) in a molar ratio of 1.70 and was held at 80° to 90° C. for 90 to 100 minutes to yield an isocyanate terminated polyether (i.e., a capped glycol), which was then cooled to 60° C. and mixed with DMAc to provide a mixture containing about 45% solids. Then, while maintaining vigorous mixing, the capped glycol was reacted for 2 to 3 minutes at a temperature of about 75° C. with DMAc solutions of diethylamine and of an 80/20 molar ratio of ethylenediamine and 1,3-cyclohexylenediamine chain extenders. The molar ratio of diamine chain extender to diethylamine was 6.31 and the molar ratio of diamine chain extenders to unreacted isocyanate in the capped glycol was 0.948. The resultant solution of segmented polyurethane contained approximately 36% solids and had a viscosity of about 2100 poises at 40° C. This polymer had an intrinsic viscosity of 0.95, measured at 25° C. in N,N-dimethylacetamide at a concentration of 0.5 gram per 100 ml of solution.

The following additives were added to the viscous polymer solution to provide the listed percentage of additive, based on the weight of the final spandex fiber without finish:

1.0% PCAP, poly(caprolactone) diol of 2000 number average molecular weight (obtained as "NIAX" polyol PCP-0240 from Union Carbide Corp., New York),
1.0% Wingstay ® L, a hindered phenol,
2.0% Weston ® DHOP, a phosphite additive,
5.0% rutile $TiO_2$ pigment,
2.0% DIPAM/DM, a dye enhancer which is a copolymer of diisopropylaminoethyl methacrylate and n-decyl methacrylate in a 70:30 weight ratio, and
0.01% UMB, ultramarine blue pigment, sold by Ricketts, Ltd., North Humberside, England.

Note that DIPAM/DM has been used in the past as a co-stabilizer for spandex fibers. However, its stabilizing effect is not significant when used with the additives of the present invention. Nonetheless, DIPAM/DM often is used with the present invention because of its dye-enhancing characteristics.

The resultant mixture was then dry-spun through orifices in a conventional manner to form 4-filament, 40-denier (44-dtex) yarns. A surface-lubricating finish of 91% polydimethylsiloxane, 5% polyamylsiloxane and 4% magnesium stearate was applied to the yarn. The yarn was then wound on a plastic-coated cardboard tube.

Spandex yarns intended for control samples were made in the same manner as described above except that instead of the combination of additives described above, the control yarn contained:

1.5% Cyanox ® 1790 hindered phenol,
5.0% rutile $TiO_2$ pigment,
2.0% DIPAM/DM dye enhancer, and
0.01% UMB.

The results of laboratory exposure tests of the yarns of the invention in comparison to control yarns are summarized below and show the large advantage in discoloration resistance possessed by the samples in accordance with the invention.

| Exposure test | $NO_2$ | SCAT |
|---|---|---|
| Exposure time, hr. | 40 | 40 |
| Discoloration | | |
| Sample, $\Delta b_s$ | 1.1 | 0.7 |
| Control, $\Delta b_c$ | 8.9 | 9.7 |
| Difference | −7.8 | −9.0 |

To confirm the advantages of the yarns containing the saturated aliphatic polyester additive in accordance with the invention, a yarn was prepared in a manner similar to that described in the preceding paragraphs. The yarn was knit into a nylon/spandex tricot fabric and then exposed for an extended period to a smoggy atmosphere. The yarns amounted to 20% by weight of the fabric. Samples of the fabric were finished with and without heat setting and with the application of an optical brightener. A control tricot fabric, knit from nylon yarns only, was prepared in a like manner. Discoloration as a result of heat setting was less for the spandex-containing fabric than for the all-nylon control (e.g., $\Delta b$ of 4.1 versus 4.8). Samples of the controls and of fabrics made with the spandex yarns containing the additive in accordance with the present invention were then exposed to atmospheric smog in Los Angeles, Calif. for 12 weeks. The test fabrics discolored less than the corresponding all-nylon samples (i.e., $\Delta b$ of 3.3 vs 4.2 for the samples finished without heat setting and 1.3 vs 2.1 for the samples finished with heat setting). These results were considered excellent for the fabric construction tested and clearly showed a surprisingly large advantage in discoloration resistance for the fabric that was knit from spandex fibers containing a saturated aliphatic polyester additive in accordance with the invention.

EXAMPLE II

This example illustrates the use of another preferred saturated aliphatic polyester additive in accordance with the invention. The procedure of Example I for making the polyether-based spandex control yarn was repeated except that the following combination of additives replaced the combination of Example I:

1.0% poly(hexamethylene adipate) diol of 2800 number average molecular weight
1.5% Cyanox ® 1790 hindered phenol
0.5% Seenox ® 412S (pentaerythritol beta-laurylthiopropionate made by WITCO Chemical Corp. of Brooklyn, N.Y.)
5.0% rutile $TiO_2$ pigment,
2.0% DIPAM/DM dye enhancer, and
0.1% UMB pigment.

The results of $NO_2$- and SCAT-exposure tests of these yarns in comparison to control yarns are summarized below and show the large advantage in discoloration resistance for the yarns of the invention.

| Exposure test | $NO_2$ | SCAT |
|---|---|---|
| Exposure time, hr. | 40 | 16 |
| Discoloration | | |
| Sample, $\Delta b_s$ | 3.0 | 1.7 |
| Control, $\Delta b_c$ | 11.8 | 6.3 |
| Difference | −8.3 | −4.6 |

EXAMPLE III

This example illustrates the effectiveness of many saturated aliphatic polyester additives in accordance with the invention in increasing the resistance of polyether-based spandex fibers to discoloration caused by fumes. The procedures of Example I for preparing the spandex control yarns were repeated except that saturated aliphatic polyester diols were also added to make the sample yarns identified in Table I below by their polyester repeating unit. Thus, the samples and controls each contained the following additives: 1.5%

Cyanox® 1790 hindered phenol, 5% rutile TiO$_2$ pigment, 2% DIPAM/DM dye enhancer and 0.01% UMB. The only difference between the test samples and the controls was the presence of the saturated aliphatic polyester additive in the sample yarns. It should be understood that in the spandex-yarn trade an additive combination such as that included in the control yarns would be considered a very good stabilizer combination.

TABLE I

Exposure Tests - Yarns of Example III

| Test No. | Repeat Unit | Mn | % Conc. | NO$_2$ Exposure $\Delta b_s$ | $\Delta b_c$ | Diff. | SCAT Exposure $\Delta b_s$ | $\Delta b_c$ | Diff. |
|---|---|---|---|---|---|---|---|---|---|
| A. Linear Polyesters |  |  |  |  |  |  |  |  |  |
| a | 2G-4 | 2557 | 1 | 10.5 | 9.4 | 1.1 | 8.3 | 6.7 | 0.6 |
| b | 2G-12 | 1595 | 4 | 8.8 | 8.9 | −0.1 | 7.7 | 9.7 | −2.0 |
| c | " | " | 8 | 8.7 | 8.9 | −0.2 | 8.5 | 9.7 | −1.2 |
| 1 | 3G-4 | 3862 | 4 | 10.5 | 11.6 | −1.1 | 11.8 | 15.1 | −3.3 |
| 2 | " | " | 8 | 10.7 | 11.6 | −0.9 | 13.3 | 15.1 | −1.8 |
| 3 | 3G-9 | 4188 | 4 | 5.0 | 11.9 | −6.9 | 7.1 | 14.4 | −7.3 |
| 4 | " | " | 8 | 3.4 | 11.9 | −8.5 | 8.4 | 14.4 | −6.0 |
| 5 | 4G-6 | — | 4 | 8.0 | 8.9 | −0.9 | 3.4 | 10.5 | −7.1 |
| 6 | " | — | 8 | 4.9 | 8.9 | −4.0 | 2.7 | 10.5 | −7.8 |
| 7 | 4G-9 | 1316 | 4 | 4.9 | 8.9 | −4.0 | 8.6 | 10.5 | −1.9 |
| 8 | " | " | 8 | 2.3 | 8.9 | −6.6 | 7.2 | 10.5 | −3.3 |
| 9 | 4G-12 | 1398 | 4 | 5.5 | 11.6 | −6.1 | 5.8 | 15.1 | −9.3 |
| 10 | " | " | 8 | 6.0 | 11.6 | −5.6 | 7.7 | 15.1 | −7.4 |
| 11 | 5G-6 | 1535 | 4 | 5.2 | 8.2 | −3.0 | 6.8 | 6.4 | 0.4 |
| 12 | " | " | 8 | 4.4 | 8.2 | −3.8 | 6.8 | 6.4 | 0.4 |
| 13 | " | " | 4 | 7.7 | 9.2 | −1.5 | 9.7 | 12.6 | −3.9 |
| 14 | " | " | 8 | 4.4 | 9.2 | −4.8 | 9.0 | 12.6 | −3.6 |
| 15 | 5G-9 | 1266 | 4 | 3.9 | 9.2 | −5.3 | 10.4 | 12.6 | −2.2 |
| 16 | " | " | 8 | 2.0 | 9.2 | −7.2 | 8.6 | 12.6 | −4.0 |
| 17 | " | " | 4 | 3.5 | 8.2 | −4.7 | 5.6 | 6.4 | −0.8 |
| 18 | " | " | 8 | 3.7 | 8.2 | −4.5 | 5.3 | 6.4 | −1.1 |
| 19 | 6G-1 | 2000 | 1 | 10.0 | 11.1 | −1.1 | 11.0 | 10.0 | 1.0 |
| 20 | " | " | 4 | 8.5 | 11.1 | −2.6 | 9.4 | 10.0 | −0.6 |
| 21 | " | " | 8 | 7.1 | 11.1 | −4.0 | 9.3 | 10.0 | −0.7 |
| 22 | 6G-4 | 2749 | 4 | 3.4 | 8.2 | −4.8 | 2.8 | 6.4 | −3.6 |
| 23 | " | " | 8 | 3.6 | 8.2 | −4.6 | 4.9 | 6.4 | −1.5 |
| 24 | " | " | 4 | 7.3 | 9.2 | −1.9 | 4.0 | 12.6 | −8.6 |
| 25 | " | " | 8 | 8.7 | 9.2 | −0.5 | 7.3 | 12.6 | −5.3 |
| 26 | 6G-6 | 2778 | 1 | 1.4 | 7.0 | −5.6 | 1.7 | 6.3 | −4.6 |
| 27 | " | " | 1.5 | 1.7 | 7.0 | −5.3 | 1.7 | 6.3 | −4.6 |
| 28 | 6G-6 | 2778 | 1 | 4.8 | 11.1 | −6.3 | 4.9 | 10.0 | −5.1 |
| 29 | " | " | 4 | 7.0 | 11.1 | −4.1 | 7.0 | 10.0 | −3.0 |
| 30 | " | " | 8 | 4.7 | 11.1 | −6.4 | 5.9 | 10.0 | −4.1 |
| 31 | " | " | 1 | 2.5 | 10.5 | −8.0 | 4.2 | 11.9 | −7.7 |
| 32 | 6G-9 | 2216 | 1 | 4.6 | 11.1 | −6.5 | 7.6 | 10.0 | −2.4 |
| 33 | " | " | 4 | 6.6 | 11.1 | −4.5 | 11.7 | 10.0 | 1.7 |
| 34 | " | " | 8 | 4.4 | 11.1 | −6.7 | 5.1 | 10.0 | −4.9 |
| 35 | 8G-4 | 1522 | 4 | 2.8 | 11.9 | −9.1 | 7.1 | 14.4 | −7.3 |
| 36 | " | " | 8 | 7.1 | 11.9 | −4.8 | 6.1 | 14.4 | −8.3 |
| 37 | 8G-6 | 2608 | 4 | 8.6 | 8.9 | −0.3 | 5.9 | 10.5 | −4.6 |
| 38 | " | " | 8 | 5.9 | 8.9 | −3.0 | 5.6 | 10.5 | −4.9 |
| 39 | 8G-9 | 2662 | 4 | 5.5 | 11.6 | −6.1 | 6.5 | 15.1 | −8.6 |
| 40 | " | " | 8 | 10.4 | 11.6 | −1.2 | 7.7 | 15.1 | −7.4 |
| 41 | 10G-4 | 1710 | 4 | 9.0 | 11.6 | −2.6 | 7.4 | 15.1 | −7.7 |
| 42 | " | " | 8 | 9.4 | 11.6 | −2.2 | 7.0 | 15.1 | −8.1 |
| 43 | PCAP | 2000 | 1 | 3.1 | 10.5 | −7.4 | 5.0 | 11.9 | −6.9 |
| 44 | " | " | 2 | 7.2 | 8.6 | −1.4 | 8.1 | 13.1 | −5.0 |
| 45 | " | " | 4 | 4.7 | 11.7 | −7.0 | 4.8 | 14.1 | −9.3 |
| d | 12G-6 | 1795 | 1 | 10.5 | 9.4 | 1.1 | 6.8 | 6.7 | 0.1 |
| e | " | " | 4 | 9.8 | 9.4 | 0.4 | 7.4 | 6.7 | 0.7 |
| f | " | " | 8 | 10.9 | 9.4 | 1.5 | 7.6 | 6.7 | 0.9 |
| g | 12G-12 | 2410 | 4 | 5.9 | 6.8 | −0.9 | 4.7 | 5.8 | −1.1 |
| B. Branched Polyesters |  |  |  |  |  |  |  |  |  |
| 46 | DM3G-4 | 1537 | 1 | 10.7 | 9.4 | 1.3 | 8.7 | 6.7 | 2.0 |
| 47 | " | " | 4 | 5.4 | 9.4 | −4.0 | 6.0 | 6.7 | −0.7 |
| 48 | DM3G-4 | 1537 | 8 | 3.8 | 9.4 | −5.6 | 4.4 | 6.7 | −2.3 |
| 49 | " | " | 1 | 7.5 | 7.2 | 0.3 | 7.7 | 9.7 | −2.0 |
| 50 | " | " | 4 | 4.7 | 7.2 | −2.5 | 4.1 | 9.7 | −5.6 |
| 51 | " | " | 8 | 1.6 | 7.2 | −5.6 | 2.7 | 9.7 | −7.0 |
| 52 | " | " | 8 | 2.4 | 8.0 | −5.6 | 2.7 | 12.5 | −9.8 |
| 53 | DM3G-6 | 3458 | 1 | 7.0 | 7.0 | 0 | 5.5 | 6.3 | −0.8 |
| 54 | " | " | 1.5 | 6.8 | 7.0 | −0.2 | 9.0 | 6.3 | 2.7 |
| 55 | " | " | 4 | 5.7 | 6.8 | −1.1 | 4.4 | 5.8 | −1.4 |
| 56 | " | 1681 | 8 | 7.0 | 8.0 | −1.0 | 9.3 | 12.5 | −3.2 |
| C. Cyclic Polyesters |  |  |  |  |  |  |  |  |  |
| 57 | HPXG-6 | 2532 | 4 | 9.0 | 9.2 | −0.2 | 7.9 | 12.6 | −4.7 |
| 58 | " | " | 8 | 8.5 | 9.2 | −0.7 | 7.1 | 12.6 | −5.5 |
| 59 | HPXG-12 | 1770 | 4 | 5.2 | 8.2 | −3.0 | 3.8 | 6.4 | −2.6 |
| 60 | " | " | 8 | 6.2 | 8.3 | −2.0 | 4.5 | 6.4 | −1.9 |

TABLE I-continued

| | | Exposure Tests - Yarns of Example III | | | | | | |
|---|---|---|---|---|---|---|---|---|
| Test No. | Repeat Unit | Mn | % Conc. | NO₂ Exposure | | | SCAT Exposure | |
| | | | | $\Delta b_s$ | $\Delta b_c$ | Diff. | $\Delta b_s$ | $\Delta b_c$ | Diff. |
| 61 | " | 2469 | 8 | 2.5 | 6.8 | −4.3 | 1.9 | 5.8 | −3.9 |

The results summarized in Table I lead to the conclusion that the improvements in resistance to fume-induced discoloration of polyether-based spandex fibers are achieved when certain saturated aliphatic polyester additives are dispersed in the spandex fibers. As shown in the table, each saturated aliphatic polyester additive that is effective have a repeating unit which is in the structural form of a residue of a glycol combined with a residue of a diacid or in the form of a residue of a hydroxy acid in which the number of carbon atoms in the shortest chain between ends of the residues is in the range of 3 to 10 for the glycol residue (with best results usually being obtained when the number is in the range of 3 to 8) and is not more than 12 (preferably 4 to 9) between the ends of the diacid residue or of the hydroxy acid residue. Comparison tests "a" through "g" which involve 2G-4, 2G-12, 12G-6 and 12G-12 polyester diol additives are clearly inferior to the polyester additives of the invention shown in runs 1 through 61. Note also the outstanding results obtained with the PCAP and 6G-6 additives.

Although this example illustrates the invention primarily with linear saturated aliphatic polyesters, some branched and cyclic saturated aliphatic polyesters have also been shown to be capable of performing as functional equivalents of the linear polyesters.

EXAMPLE IV

This example demonstrates the superiority of the polyester antifume additives in accordance with the invention over monoester additives disclosed in the art.

Four spandex yarns, two of the invention and two comparison yarns, were prepared. The procedures described in Example I for preparing the control yarns were used except that the following additional additives were dispersed in the yarns:

| Sample I | 1% PCAP-diol (2000 molecular weight) |
|---|---|
| Sample II | 1% 6G-6 diol (2778 molecular weight) |
| Comparison A | 1.5% dodecyl stearate |
| Comparison B | 3% dodecyl stearate. |

The sample yarns of the invention (I and II) and the comparison yarns of the art (A and B) were given, along with control yarns, a 20-hour NO₂-exposure test and a 20-hour SCAT-exposure test, with the yarns in two conditions: namely, (1) as produced, and (2) after a simulating finishing treatment. In the simulated finishing treatment the yarns were wound on sample holders and then placed in an aqueous medium and heated for 30 minutes at 70° C. and then for an additional 30 minutes at 80° C. The composition of the aqueous medium consisted of 3 grams of Duponol ® ME (sodium lauryl sulfate surface active agent manufactured by E. I. du Pont de Nemours and Company of Wilmington, Del.), 3 grams of tetrasodium pyrophosphte and 0.8 grams of ethylene diamine tetraacetic acid in 2 liters of waters. After the heating, the samples were rinsed in tap water and then air-dried for about 16 hours. The results of the tests are recorded in Table II.

TABLE II

| | Of Invention | | Comparisons | |
|---|---|---|---|---|
| | | | Yarn | |
| | I | II | A | B |
| Additive | PCAP | 6G-6 | Dodecyl Stearate | Dodecyl Stearate |
| Conc. % | 1.0 | 1.0 | 1.5 | 3.0 |
| As-prepared exposure | | | | |
| NO₂ test | | | | |
| $\Delta b_s$ | 3.1 | 2.5 | 8.5 | 7.6 |
| $\Delta b_c$ | 10.5 | 10.5 | 10.5 | 10.5 |
| Diff. | −7.4 | −8.0 | −2.0 | −2.9 |
| SCAT test | | | | |
| $\Delta b_s$ | 5.0 | 4.2 | 10.5 | 9.0 |
| $\Delta b_c$ | 11.9 | 11.9 | 11.9 | 11.9 |
| Diff. | −6.9 | −7.7 | −1.4 | −2.9 |
| "After" finishing | | | | |
| NO₂ test | | | | |
| $\Delta b_s$ | 3.5 | 4.6 | 11.0 | 11.7 |
| $\Delta B_c$ | 8.9 | 8.9 | 8.9 | 8.9 |
| Diff. | −5.4 | −4.3 | +2.1 | +2.8 |
| SCAT test | | | | |
| $\Delta b_s$ | 5.4 | 5.7 | 9.4 | 9.5 |
| $\Delta b_c$ | 13.4 | 13.4 | 13.4 | 13.4 |
| Diff. | −8.0 | −7.7 | −4.0 | −3.9 |

As can be seen from Table II, the two yarns in accordance with the present invention clearly outperformed the two comparison yarns containing the dodecyl stearate monoester suggested by the art in both the NO₂- and the SCAT exposure tests. Note also that whereas the yarns in accordance with the invention were relatively unaffected by the finishing treatment, but the yarns with the dodecyl stearate were strongly and detrimentally affected by the finishing treatment.

I claim:

1. In a polyether-based spandex fiber containing a saturated aliphatic ester, the improvement comprising a saturated aliphatic polyester in an amount effective in reducing fume-induced discoloration, the amount being no more than 10% by weight of the fiber and the polyester having a number average molecular weight of greater than 600 and less than 10,000 and a repeating unit which has the structural form of a residue of a glycol reacted with the residue of a diacid or the form of a residue of a hydroxy acid, wherein the number of carbon atoms in the shortest chain between ends of the residues is in the range of 3 to 10 for the glycol residue and no more than 12 for the diacid residue or for the hydroxy acid residue.

2. A fiber of claim 1 wherein the number of carbon atoms is in the range of 3 to 8 in the glycol residue and is in the range of 4 to 9 in the diacid residue or the hydroxy acid residue.

3. A fiber of claim 1 or 2 wherein the amount of polyester present is in the range of 0.5 to 10% by weight of the fiber.

4. A fiber of claim 3 wherein the amount of polyester is in the range of 1 to 5%.

5. A fiber of claim 1 wherein the saturated aliphatic polyester is linear.

6. A fiber of claim 5 wherein the polyester is a poly(caprolactone).

7. A fiber of claim 5 wherein the polyester is a poly(hexamethylene adipate).

8. A fiber of claim 1 wherein the fiber contains a phenolic stabilizer.

9. A fiber of claim 8 wherein the fiber contains a phosphite additive.

10. A fiber of claim 6 or 7 wherein the fiber contains a phenolic stabilizer and a dialkyl phenyl phosphite.

* * * * *